Patented Nov. 12, 1929

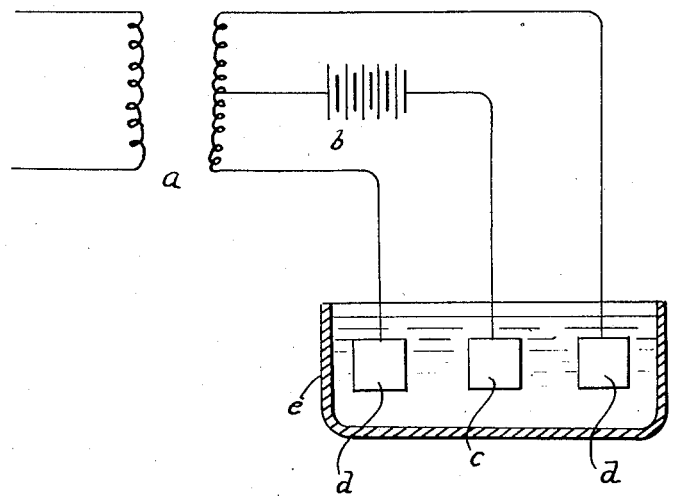

1,735,509

UNITED STATES PATENT OFFICE

SHOJI SETOH, OF TOKYO, AND SAKAE UEKI, DECEASED, LATE OF OAZA, JAPAN, BY UNO UEKI, OF OAZA, JAPAN, ADMINISTRATRIX, ASSIGNORS TO ZAIDAN HOJIN RIKAGAKU KENKYUJO, OF TOKYO, JAPAN

PROCESS OF FORMING AN ELECTRICALLY INSULATING AND ANTICORROSIVE OXIDE COATING ON ALUMINUM MATERIAL

Application filed October 22, 1926, Serial No. 143,528, and in Japan October 30, 1925.

This invention relates to an improvement of a process of forming an electrically insulating and anti-corrosive oxide coating on aluminum material comprising electrolyzing a solution having oxalic acid or oxalates, and employing aluminum material as the positive electrode for the direct current, and aluminum material or other electric conductive material as the negative electrode, characterized by the fact that the alternating current is also supplied to the electrodes simultaneous with the supply of the direct current. The object of the invention is to obviate the tendency of the aluminum material comprising the positive electrode to corrode during the electrolytic operation when direct current only is used, as well as to increase the speed of formation of the oxide coating owing to the superposed effect of both currents.

One example of an apparatus for carrying out the invention is shown in the accompanying drawing, in which $a$ is a transformer with its secondary neutral point connected to the positive terminal of $b$, a source of direct current, $c$ the negative electrode, $d$ and $d$ the positive electrodes and $e$ an electrolytic bath in section. The solution may be 1.0 to 3.0% aqueous solution of oxalic acid or oxalates such as sodium oxalate or potassium oxalate. The negative electrode $c$ may be of any convenient conducting material while $d$ and $d$ are of aluminum material which is to be coated with an oxide coating. From the source of direct current $b$, a direct current of, say, 60 to 90 volts is supplied and at the same time an alternating current of 60 to 120 volts is also supplied to the two positive electrodes $d$ and $d$, the total density of the current being from 0.05 to 0.2 amperes per square centimeter.

In carrying out the process described in U. S. patent application Serial No. 753,525, when alternating current only is used, there is the defect that the speed of formation of the oxide coating is small and therefore the time necessary for forming the oxide coating of desired thickness prolonged. When direct current only is used for the purpose, although the speed of formation of the oxide coating is great, there is a great drawback in that the aluminum material under treatment is attacked or corroded at points where the circulation of electrolyte is inadequate, especially if agitation of the electrolytic solution is insufficient, or if the temperature of the solution is high. This corrosive effect often leads to breakage of the aluminum material during the treatment.

Now according to this invention, there are two great merits in that, firstly, during the operation there is no danger of the aluminum material corroding; secondly, the speed of formation of the oxide coating becomes great and consequently the time required therefor is remarkably shortened. The reasons why such a desirable result can be obtained by this improvement may be explained as follows.

The first may be due to the fact that the oxalic acid radicals accumulate at the positive electrode together with oxygen produced by the electrolysis and the radicals act upon the aluminum material so as to produce aluminum oxalate. This action is remarkable, especially where the circulation of the electrolytic solution is insufficient such as at junctions or contacting points, and when the temperature of the electrolytic solution is raised and therefore such special points finally become corroded and attacked. This drawback, however, is not met when alternating current only is used, because in using A. C. oxalic acid radicals which have collected on the surface during a half wave are repelled by the voltage in the opposite direction and can not thus accumulate on the electrodes. Therefore by using A. C. simultaneously with D. C., the drawback of the aluminum material corroding is obviated and at the same time, the time required for forming a desired thickness of oxide coating is shortened because the speed of such formation becomes greater by the influence of A. C. over the action of D. C., which, as beforesaid, has in itself comparatively large speed for the formation.

Claims:

1. The process of forming an electrically insulating and anti-corrosive oxide coating on aluminum material which comprises simultaneously electrolyzing a solution containing an oxalic acid compound with alternating and direct current employing aluminum material as the positive electrode and electric conducting material as the negative electrode for the direct current.

2. The process of forming an electrically insulating and anti-corrosive oxide coating on aluminum material which comprises simultaneously electrolyzing a solution containing oxalic acid with alternating and direct current employing aluminum material as the positive electrode and electric conducting material as the negative electrode for the direct current.

In testimony whereof we have affixed our signatures.

SHOJI SETOH.
UNO UEKI,
*Administratrix of the Late Sakae Ueki, Deceased.*